United States Patent
Owyeung et al.

(10) Patent No.: US 7,679,602 B2
(45) Date of Patent: Mar. 16, 2010

(54) GRAPHICAL USER INTERFACE BASED CONTROL OF IMAGING PARAMETERS INCLUDING SCENE ILLUMINATION PARAMETERS

(75) Inventors: Willard Owyeung, Sunnyvale, CA (US); Cheah Chun Hean, Penang (MY); Ko Choon Guan, Penang (MY)

(73) Assignee: Aptina Imaging Corporation, Grand Cayman (KY)

( * ) Notice: Subject to any disclaimer, the term of this patent is extended or adjusted under 35 U.S.C. 154(b) by 727 days.

(21) Appl. No.: 11/525,282

(22) Filed: Sep. 22, 2006

(65) Prior Publication Data
US 2008/0074380 A1 Mar. 27, 2008

(51) Int. Cl.
*G09G 5/00* (2006.01)
(52) U.S. Cl. .................... 345/156; 345/594
(58) Field of Classification Search ................. 345/156, 345/594; 709/204; 250/214 AG, 214 AL
See application file for complete search history.

(56) References Cited

U.S. PATENT DOCUMENTS

| | | | |
|---|---|---|---|
| 5,406,348 A * | 4/1995 | Wheeler | 396/166 |
| 5,752,115 A | 5/1998 | McIntyre et al. | |
| 5,758,199 A | 5/1998 | Keller | |
| 6,346,962 B1 | 2/2002 | Goodridge | |
| 6,601,767 B1 | 8/2003 | Gu et al. | |
| 6,687,515 B1 | 2/2004 | Kosaka | |
| 6,842,652 B2 | 1/2005 | Yeung | |
| 6,909,499 B2 * | 6/2005 | Sander | 356/230 |
| 6,995,794 B2 | 2/2006 | Hsu et al. | |
| 7,019,778 B1 | 3/2006 | Prabhu et al. | |
| 7,462,806 B2 * | 12/2008 | Huh | 250/205 |
| 2003/0095185 A1* | 5/2003 | Naifeh | 348/156 |
| 2005/0062874 A1 | 3/2005 | Shiga et al. | |
| 2006/0044461 A1 | 3/2006 | Popescu-Stanesti et al. | |
| 2008/0097203 A1* | 4/2008 | Nereson et al. | 600/437 |
| 2009/0091634 A1* | 4/2009 | Kennedy et al. | 348/217.1 |

OTHER PUBLICATIONS

Yeoh Boon Keng et al., "Implement LED flash in camera phones," Electronic Engineering Times, www.eetasia.com, Jun. 1, 2006.

* cited by examiner

*Primary Examiner*—Richard Hjerpe
*Assistant Examiner*—Tom V Sheng
(74) *Attorney, Agent, or Firm*—RatnerPrestia

(57) ABSTRACT

Systems and methods that provide graphical user interface based control of imaging parameters, including scene illumination parameters, are described. In one aspect, optical data is generated in response to light received from a field of view. Output light is produced. The output light is projected toward the field of view. At least a portion of the optical data is processed into image data that is presentable on a display. A brightness control interface that receives user input specifying a brightness level is generated on the display. An illumination control signal is produced in response to user input specifying a brightness level to the brightness control interface. The illumination control signal configures the output light to be produced with a brightness level corresponding to the brightness level specified to the brightness control interface.

21 Claims, 8 Drawing Sheets

GRAPHICAL USER INTERFACE BASED CONTROL OF IMAGING PARAMETERS INCLUDING SCENE ILLUMINATION PARAMETERS

BACKGROUND

Imaging devices are being incorporated in a wide variety of devices, including digital still image cameras, digital video cameras, cameras designed for desktop and mobile computers (often referred to as "pc cameras" or "webcams"), input devices (e.g., optical navigations sensors in computer mice), handheld electronic devices (e.g., mobile telephones), and other embedded environments. With the increasing trends of minimizing the sizes of camera-equipped multifunction devices and combining more functionalities into single devices, there is a constant push toward reducing the cost and space required for implementing each and every device functionality, including imaging functionality.

Although image quality is important to consumers of camera-equipped multifunction devices, image quality typically is not optimized in such devices due to the inherent constraints imposed by the various functions of such devices. At the same time, image quality can be improved by including relatively modest features into these devices. For example, many portable camera-equipped multifunction devices (e.g., camera-equipped mobile telephones and portable computers) typically are used in locations that have insufficient lighting for capturing images of even minimal acceptable quality. In response to this problem, some camera-equipped multifunction devices have been designed with ambient light sensors that trigger warnings that indicate when the light level is inadequate. Upon receipt of this warning, users of such devices can increase the level of light in such locations (e.g., by turning on an external light) or move to a location that is adequately lit.

Dedicated imaging devices, such as digital video cameras and digital still image cameras, typically include photoflash lamps that illuminate the scenes being recorded. These devices oftentimes include a controller that automatically adjusts the lighting level provided by the photoflash lamps based on the ambient light level. Other than being able to selectively enable and disable the photoflash functionality of these dedicated-function cameras, however, users typically have no control over lighting level. In addition, the control interfaces that are used in dedicated-function cameras typically are inadequate or impractical to incorporate into most camera-equipped multifunction devices, such as mobile telephones and computer-based devices and system.

What are needed are systems and methods of providing graphical user interface based control of imaging parameters, including scene illumination parameters, in a way that enhances the functionality and usability of camera-equipped multifunction devices, while improving the quality of images captured by such devices.

SUMMARY

In one aspect, the invention features a system that includes a display, an optical sensor system, a light source, and a processing system. The optical sensor system generates optical data in response to light received from a field of view. The light source produces output light with a variable brightness level and projects the output light toward the field of view. The processing system processes at least a portion of the optical data into image data that is presentable on the display. The processing system also generates on the display a brightness control interface that is operable to receive user input specifying a brightness level. The processing system additionally produces an illumination control signal in response to user input specifying a brightness level to the brightness control interface. The illumination control signal configures the light source to produce the output light with a brightness level corresponding to the brightness level specified to the brightness control interface.

In another aspect, the invention features a method in accordance with which optical data is generated in response to light received from a field of view. Output light is produced. The output light is projected toward the field of view. At least a portion of the optical data is processed into image data that is presentable on a display. A brightness control interface that receives user input specifying a brightness level is generated on the display. An illumination control signal is produced in response to user input specifying a brightness level to the brightness control interface. The illumination control signal configures the output light to be produced with a brightness level corresponding to the brightness level specified to the brightness control interface.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Introduction

The embodiments that are described in detail below feature an imaging system that provides graphical user interface based control of imaging parameters, including scene illumination parameters. The imaging system can be integrated readily into multifunction devices and systems. The imaging system enhances the functionality and usability of camera-equipped multifunction devices, while improving the quality of images captured by such devices. Embodiments of the imaging system provide an intuitive mechanism for controlling imaging parameters, such as the brightness level of output light that is produced by a light source 14 and an aperture size of an optical sensor subsystem. Embodiments of the imaging system present captured images on a display, thereby providing users with real-time visual feedback of the effects of changing one or more imaging parameters.

II. Overview

Figure 1:
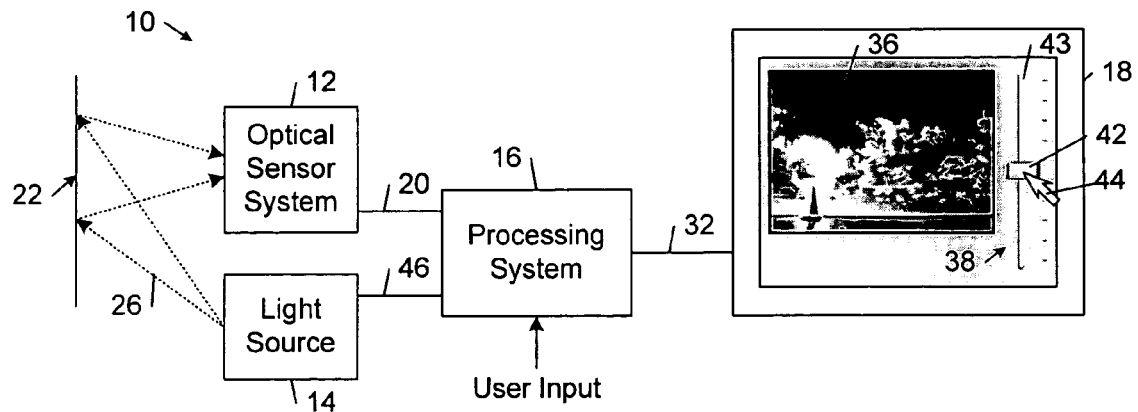
FIG. 1 is a diagrammatic view of an embodiment of an imaging system that includes an optical sensor system, a light source, and a processing system in an exemplary operational environment.

FIG. 1 shows an embodiment of an imaging system 10 that includes an optical sensor system 12, a light source 14, a processing system 16, and a display 18.

Figure 2:
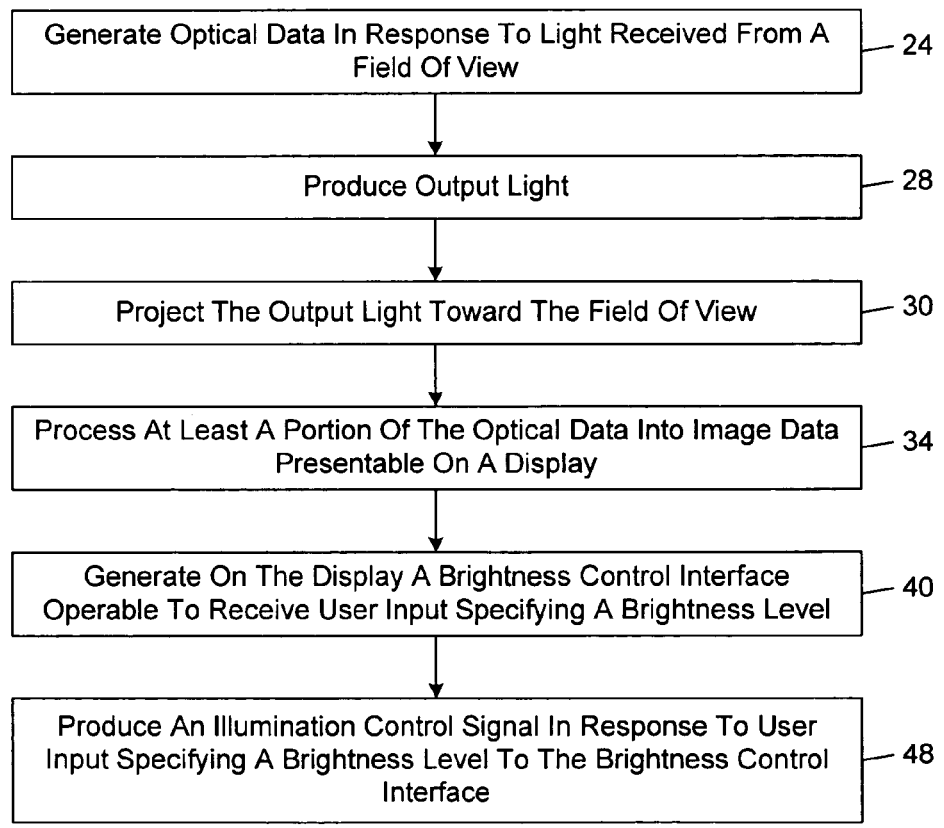
FIG. 2 is a flow diagram of an embodiment of a method executed by the imaging system shown in FIG. 1.

FIG. 2 shows an embodiment of a method that is executed by the imaging system 10. In accordance with this method, the optical sensor system 12 generates optical data 20 in response to light received from a field of view 22 (FIG. 2, block 24). The light source 14 produces output light 26 (FIG. 2, block 28) and projects the output light 26 toward the field of view 22 (FIG. 2, block 30).

The processing system 16 processes at least a portion of the optical data 20 into image data 32 that is presentable on the display 18 (FIG. 2, block 34). The image data 32 may be presented in a window 36 on the display 18 in the form of one or more still images or a sequence of video frames.

The processing system 16 also generates on the display 18 a brightness control interface 38 that is operable to receive user input specifying a brightness level (FIG. 2, block 40). In general, the brightness control interface 38 may be implemented by any type of graphical user interface that allows a user to specify a brightness level. In some embodiments, the brightness control interface includes a graphical input mechanism that enables a user to specify a brightness level using a virtual pointer. In other embodiments, the brightness control interface includes a text box that enables a user to specify a brightness level using text input mechanism (e.g., a keyboard or a keypad). In the illustrated embodiment, the brightness control interface 38 is implemented by a slider 42 that is movable along a virtual sliding track 43, which corresponds to a brightness scale from a minimum brightness level of the light source 14 (e.g., an off state in which no output light is produced) to a maximum brightness level of the light source (e.g., a full power state in which the output light 26 is produced with a specified maximum brightness level). The slider 42 may be selected and moved in response to manipulation of a virtual pointer 44 by a user. For example, a user may move the virtual pointer 44 over the slider 42 using a pointing device (e.g., a computer mouse), activate (or "click") an input button on the pointing device to associate movement of the slider 42 with movement of the virtual pointer 44, and move the slider to a desired position on the sliding track 43.

The processing system 16 produces an illumination control signal 46 in response to user input specifying a brightness level to the brightness control interface 38 (FIG. 2, block 48). The illumination control signal 46 configures the light source 14 to produce the output light 26 with a brightness level corresponding to the brightness level specified to the brightness control interface 38.

III. Exemplary Embodiments of the Imaging System and its Components

A. Exemplary Embodiments of the Light Source

Referring back to FIG. 1, the light source 14 projects output light 26 within a specified wavelength range toward the field of view 22. Exemplary light sources include light emitting diodes, single-mode lasers, and multimode lasers. The light source 14 may include one or more optical elements for directing (e.g., shaping, focusing, or changing the propagation path of) the output light 26 to an illumination area that coincides with at least a portion of the field of view 22.

B. Exemplary Embodiments of the Optical Sensor System

The optical sensor system 12 may be implemented by any type of imaging device that is capable of capturing one-dimensional or two-dimensional images of a scene. The optical sensor system 12 typically includes at least one image sensing component with a respective light sensing active area. Exemplary image sensing components include charge coupled devices (CCDs) and a complementary metal-oxide-semiconductor (CMOS) devices. The image sensing components are capable of detecting light within the specified wavelength range of the output light 26 that is produced by the light source 14. The image sensor 14 may include one or more optical elements for directing (e.g., shaping, focusing, or changing the propagation path of) the incoming light from the field of view 22.

Figure 3:
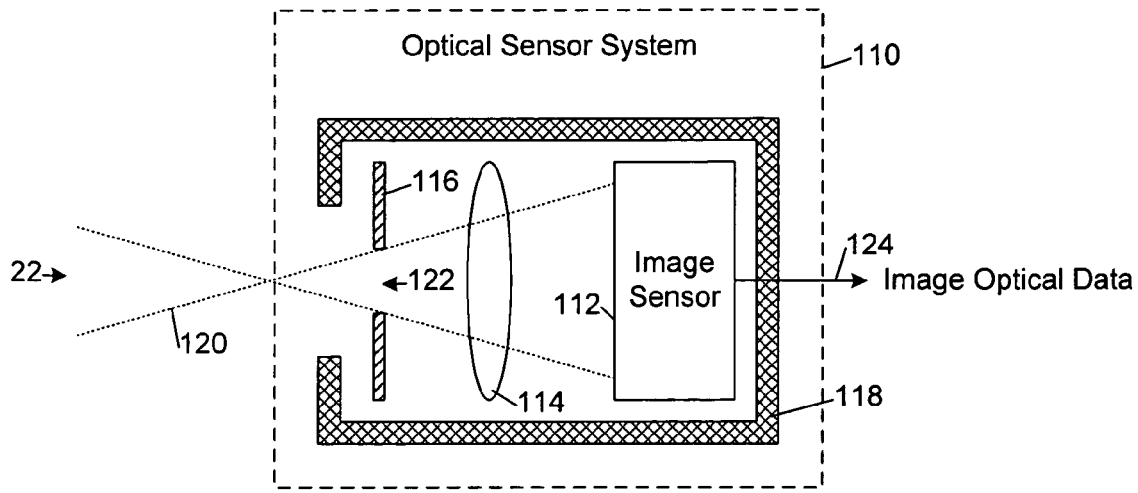
FIG. 3 is a diagrammatic view of an embodiment of the optical sensor system shown in FIG. 1.

FIG. 3 shows an embodiment 110 of the optical sensor system 12 that includes an image sensor 112, an optical system 114, and a diaphragm 116 that are contained within a housing 118. The image sensor 112 typically is implemented by a two-dimensional CCD or CMOS image sensor. The optical system 114 typically is implemented by one or more lenses that focus the incoming light 120 from the field of view 22 onto the active region of the image sensor 112. The diaphragm 116 defines an aperture 122 that controls the amount of incoming light that is focused by the optical system 114. In operation, the image sensor 112 produces image optical data 124 from the incoming light 120 that is focused by the optical system 114 onto the active region.

Figure 4:
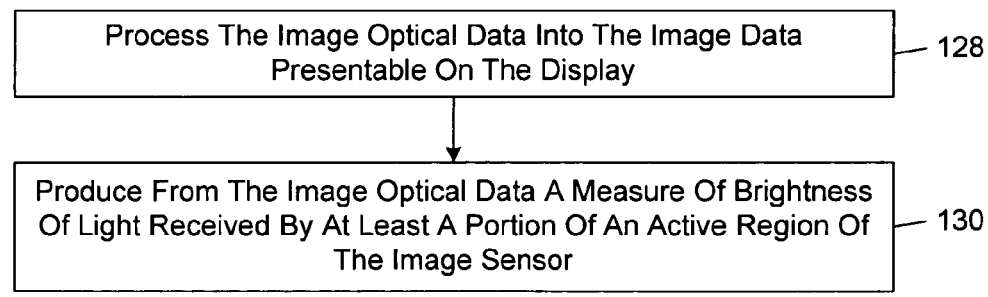
FIG. 4 is a flow diagram of an embodiment of a method executed by an embodiment of the processing system shown in FIG. 1.

FIG. 4 shows an embodiment of a method that is executed by the processing system 16 in an embodiment of the imaging system 10 that includes the optical sensor system 110. In accordance with this method, the processing system 16 processes the image optical data 124 into the image data 32 (FIG. 4, block 128). The processing system 16 typically produces the image data 32 from the image optical data 124 in accordance with a standard image processing method. The processing system 16 produces from the image optical data 124 a measure of brightness of light received by at least a portion of the active region of the image sensor 112 (FIG. 4, block 130). In one embodiment, the brightness measure corresponds to a measure of the average luminance level of the pixels in an area of the active region during an image capture cycle.

Figure 5:
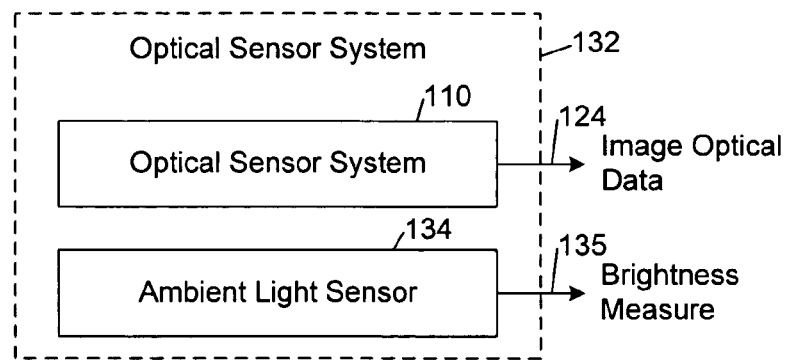
FIG. 5 is a diagrammatic view of an embodiment of the optical sensor system shown in FIG. 1.

FIG. 5 shows an embodiment 132 of the optical sensor system 12 that includes the optical sensor system 110, which produces the image optical data 124, and an ambient light sensor 134, which produces a measure 135 of brightness of light received by the ambient light sensor 134. The optical sensor system 110 is implemented as described in connection with FIG. 6. The ambient light sensor 134 typically is implemented by a photosensing element (e.g., a photodiode). In one exemplary embodiment, the ambient light sensor is a series 9000 APDS ambient light sensor, available from Avago Technologies, Inc. of San Jose, Calif., U.S.A., that produces an output that varies linearly with changes in the ambient light environment. In some embodiments, the output of the ambient light sensor 134 is converted by an external load resistor to an output voltage that is applied to an amplifier circuit or a voltage comparator circuit. The voltage comparator circuit typically is configured to produce a logic high output value if the output voltage is greater than a reference voltage (i.e., if the ambient light level is above a specified threshold) and to produce a logic low output value if the output voltage is at or below the reference voltage (i.e., if the ambient light level is at or below the specified threshold).

Figure 6:
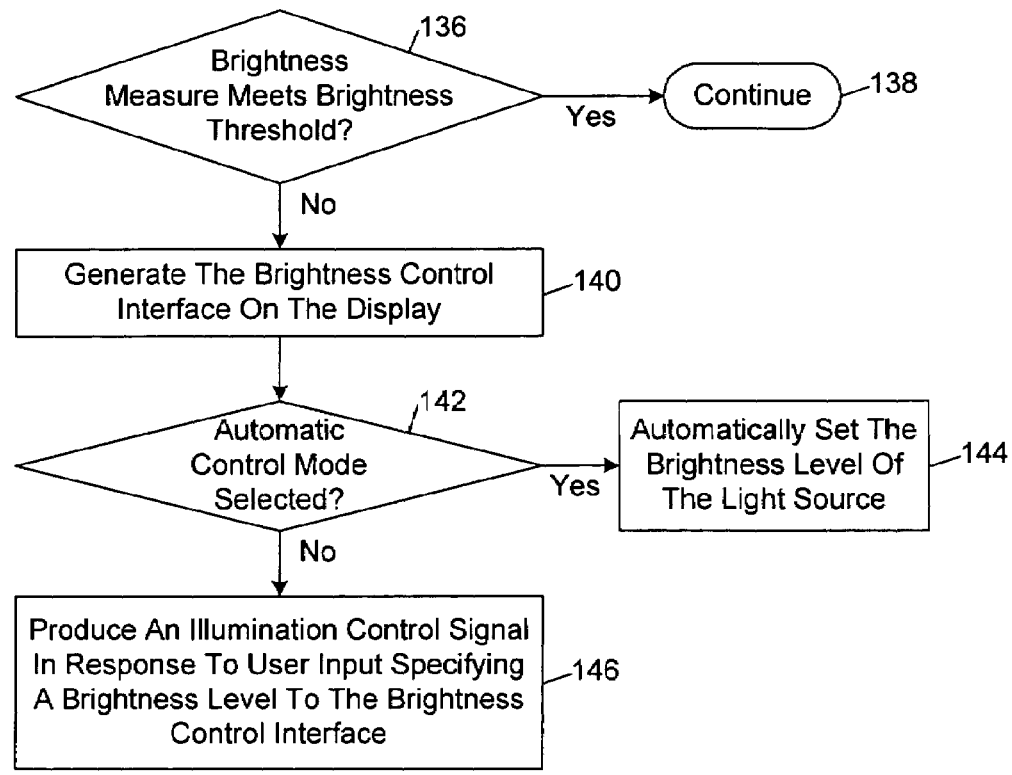
FIG. 6 is a flow diagram of an embodiment of a method executed by an embodiment of the processing system shown in FIG. 1.

FIG. 6 shows an embodiment of a method that is executed by the processing system 16 in an embodiment of the imaging system 10 that includes the optical sensor system 132. In accordance with this method, the processing system 16 determines whether the brightness measure 135 meets a specified brightness threshold (FIG. 6, block 136). If the brightness measure 135 meets the brightness threshold (FIG. 6, block 136), the processing system 16 processes the image optical data 124 into the image data 32 (FIG. 6, block 138). If the brightness measure 135 does not meet the brightness threshold (FIG. 6, block 136), the processing system 16 generates the brightness control interface 38 on the display 18 (FIG. 6, block 140). If the user has selected an automatic brightness control mode (FIG. 6, block 142), the processing system 16 automatically sets the brightness level of the light source 14 (FIG. 6, block 144). In some embodiments, the brightness level of the light source is set automatically by the imaging and brightness level control subsystem 180 shown in FIG. 10 in accordance with the method shown in FIG. 11. If the user has not selected an automatic brightness control mode (FIG. 6, block 142), the processing system 16 produces the illumination control signal 46 in response to user input specifying a brightness level to the brightness control interface 38 (FIG. 6, block 146).

Figure 7:
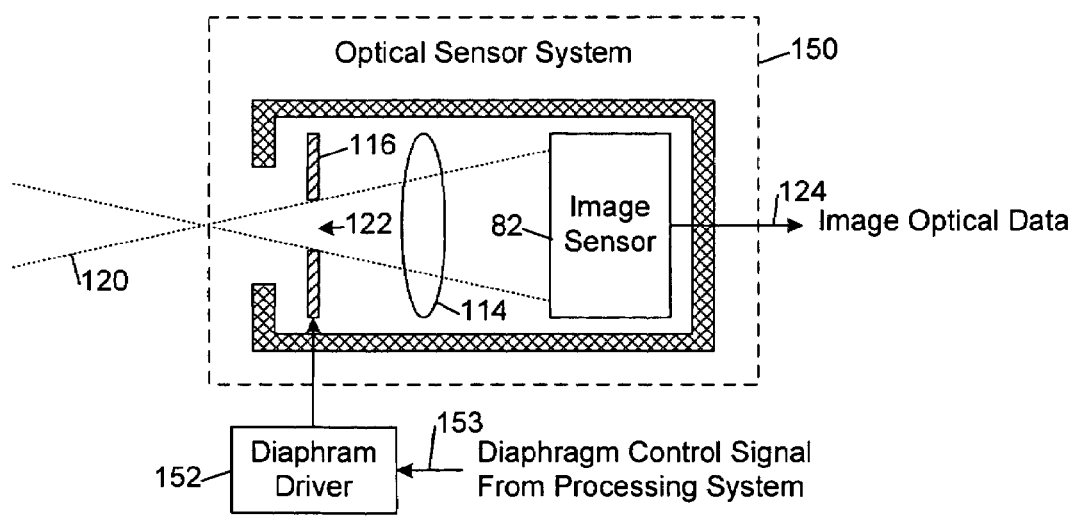
FIG. 7 is a diagrammatic view of an embodiment of the optical sensor system shown in FIG. 1.

FIG. 7 shows an embodiment 150 of the optical sensor system 12 that corresponds to the optical sensor system 110 except that, in the optical sensor system 150, the diaphragm 116 is configurable to define the aperture 122 with a variable size. The size of the aperture 122 is controlled by a diaphragm driver 152, which is responsive to a diaphragm control signal 153 that is produced by the processing system 16.

Figure 8:
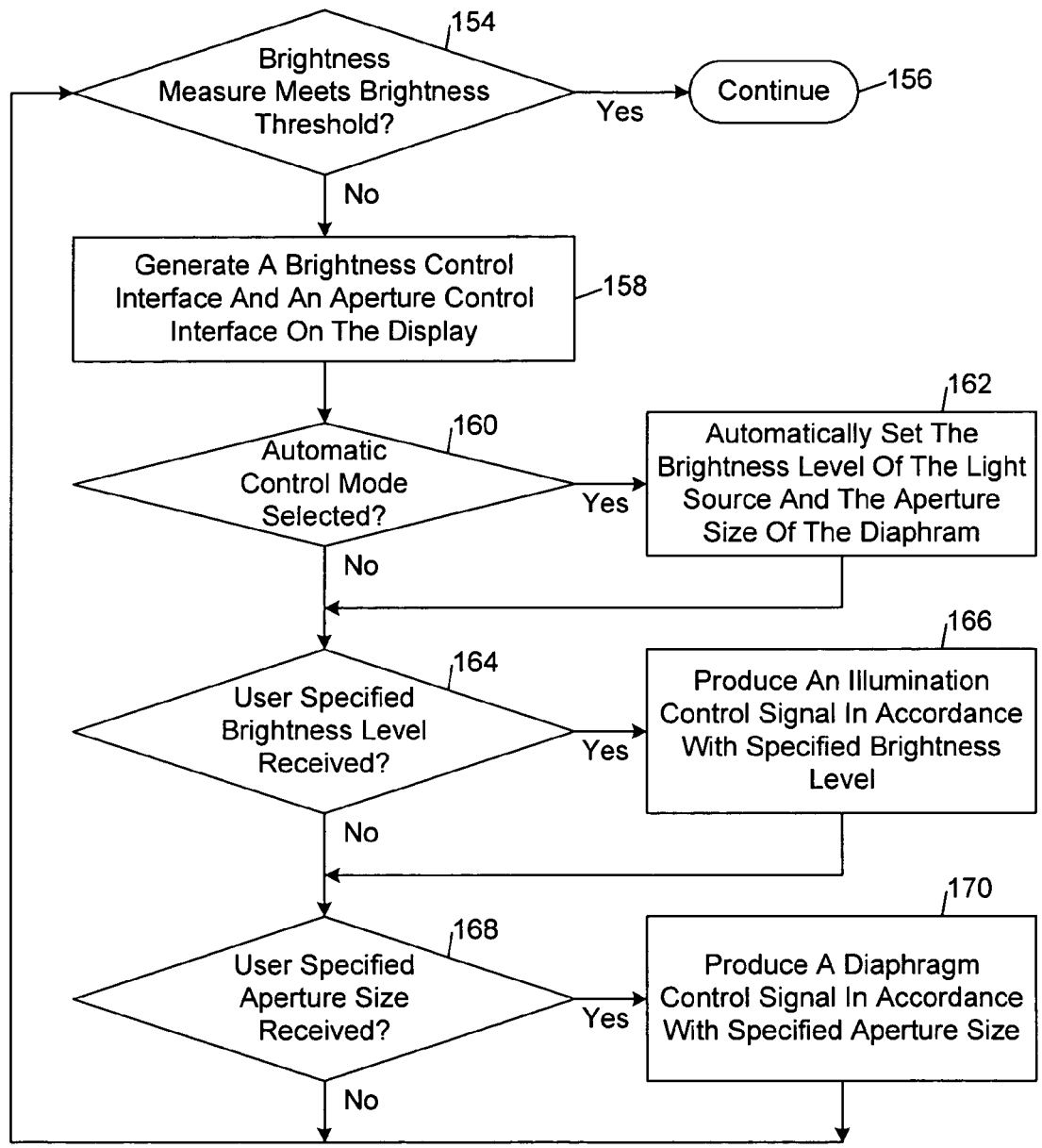
FIG. 8 is a flow diagram of an embodiment of a method executed by an embodiment of the processing system shown in FIG. 1.

FIG. 8 shows an embodiment of a method that is executed by the processing system 16 in embodiments of the imaging system 10 that includes the optical sensor system 150. In some of these embodiments, the brightness measure is computed from the image optical data 124. Some other ones of these embodiments include the ambient light sensor 134, which produces the brightness measure 135.

In accordance with this method, the processing system 16 determines whether the brightness measure meets a specified brightness threshold (FIG. 8, block 154). If the brightness measure meets the brightness threshold (FIG. 8, block 154), the processing system 16 processes the image optical data 124 into the image data 32 (FIG. 8, block 156).

Figure 9:
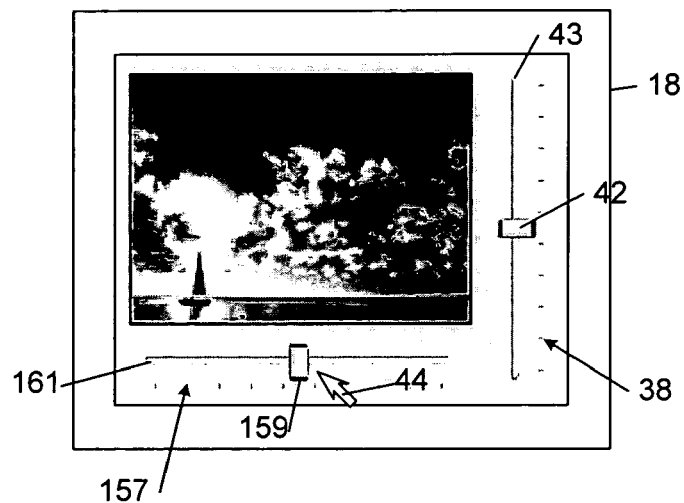
FIG. 9 is a diagrammatic view of an embodiment of a graphical user interface being presented on an embodiment of the display shown in FIG.1.

Referring to FIGS. 8 and 9, if the brightness measure 135 does not meet the brightness threshold (FIG. 8, block 154), the processing system 16 generates the brightness control interface 38 and an aperture control interface 157 on the display 18 (FIG. 8, block 158). In general, the aperture control interface 157 may be implemented by any type of graphical user interface that allows a user to specify an aperture size. In some embodiments, the aperture control interface 157 includes a graphical input mechanism that enables a user to specify an aperture size using the virtual pointer 44. In other embodiments, the aperture control interface includes a text box that enables a user to specify an aperture using text input mechanism (e.g., a keyboard or a keypad). In the embodiment shown in FIG. 9, the aperture control interface 157 is implemented by a slider 159 that is movable along a virtual sliding track 161, which corresponds to an aperture size scale ranging from a minimum numerical aperture defined by the diaphragm 116 (e.g., a closed state in which no input light is received) to a maximum numerical aperture defined by the diaphragm 116 (e.g., a fully open state in which the diaphragm 116 is fully open to allow the maximum amount of light from the field of view to be received by the image sensor 112). The slider 159 may be selected and moved in response to manipulation of the virtual pointer 44 by a user. For example, a user may move the virtual pointer 44 over the slider 159 using a pointing device (e.g., a computer mouse), activate (or "click") an input button on the pointing device to associate movement of the slider 159 with movement of the virtual pointer 44, and move the slider 159 to a desired position on the sliding track 161.

If the user has selected an automatic brightness control mode (FIG. 8, block 160), the processing system 16 automatically sets the brightness level of the light source 14 (FIG. 8, block 162). In some embodiments, the brightness level of the light source is set automatically by the imaging and brightness level control subsystem 180 shown in FIG. 10 in accordance with the method shown in FIG. 11. If the user has not selected an automatic brightness control mode (FIG. 8, block 162), the processing system 16 determines whether the user has specified a brightness level to the brightness control interface 38 (FIG. 8, block 164). If the user has specified a brightness level (FIG. 8, block 164), the processing system 16 produces the illumination control signal 46 in accordance with the specified brightness level (FIG. 8, block 166).

The processing system 16 determines whether the user has specified an aperture size to the aperture control interface 157 (FIG. 8, block 168). If the user has specified an aperture size (FIG. 8, block 168), the processing system 16 produces the diaphragm control signal 153 in accordance with the specified aperture size (FIG. 8, block 170). The processing system 16 then repeats the process (FIG. 8, blocks 154-170).

C. Exemplary Embodiments of the Processing System

In general, the processing system 16 may be implemented by one or more discrete modules that are not limited to any particular hardware, firmware, or software configuration. The one or more modules may be implemented in any computing or data processing environment, including in digital electronic circuitry (e.g., an application-specific integrated circuit, such as a digital signal processor (DSP)) or in computer hardware, firmware, device driver, or software.

In some implementations, computer process instructions for implementing the methods that are described herein and the data they generate are stored in one or more machine-readable media. Storage devices suitable for tangibly embodying these instructions and data include all forms of non-volatile memory, including, for example, semiconductor memory devices, such as EPROM, EEPROM, and flash memory devices, magnetic disks such as internal hard disks and removable hard disks, magneto-optical disks, and CD-ROM.

D. Exemplary Embodiments of the Display

The display 18 may be any type of display that is capable of presenting images, including a light-emitting display and a light-reflecting display. Among the exemplary types of light-emitting displays are LED-based display screens and plasma display screens. Among the exemplary types of light-reflecting displays are projection screens, which are designed to reflect light that is projected from one or more light projectors.

Figure 10:
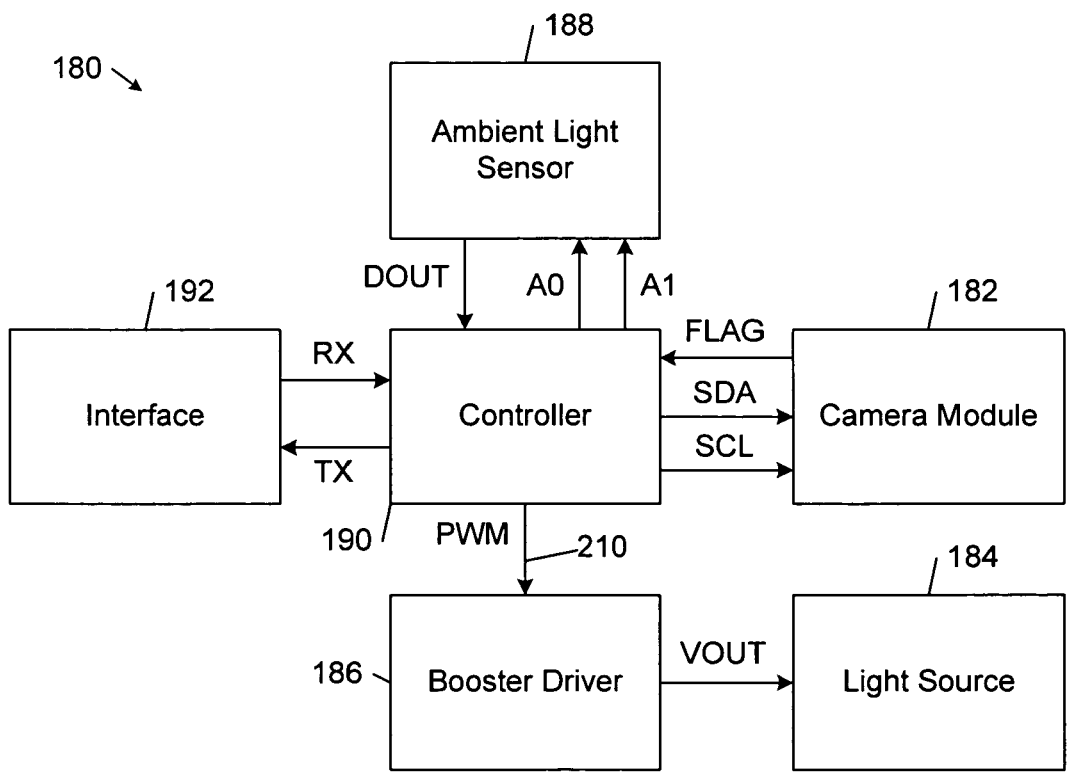
FIG. 10 is a block diagram of an embodiment of the imaging system shown in FIG. 1.

E. Exemplary Embodiments of an Imaging and Brightness Control Subsystem of the Imaging System FIG. 10 shows an embodiment 180 of an imaging and brightness control subsystem of the imaging system 10 that includes a camera module 182, a light source 184, a booster driver 186, an ambient light sensor 188, a controller 190, and an interface 192.

The camera module 182 may be implemented by any type of camera module. In one exemplary embodiment, the camera module 182 is an ADCC-3000 image sensor available from Avago Technologies, Inc.

The light source 184 typically is implemented by a xenon flash tube based light source or a white LED (light emitting diode) based light source. In the illustrated embodiment, the light source 184 is implemented by a flash LED based light source. In this embodiment, the booster driver 186 converts an input voltage to a constant current that drives the light source 184 to obtain constant light output. In some embodiments, the booster driver 186 is implemented by a charge pump converter. In other embodiments, the booster driver 186 is implemented by a voltage booster converter.

The light ambient light sensor 188 may be implemented by any type of light sensor. In the illustrated embodiment, the ambient light sensor 188 is implemented by an HSDL-9000 digital output ambient light sensor available from Avago Technologies, Inc. The ambient light sensor 188 includes a photodiode and an analog-to-digital converter circuit. The inputs A0 and A1 allow the controller 190 to program three different light level threshold settings. In particular, the inputs A0 and A1 control the effective resistance of an external resistor, which controls the gain level in accordance with TABLE 1.

TABLE 1

| A1 | A0 | Description | Light Threshold (lux) |
|---|---|---|---|
| 0 | 0 | High Gain | 30 |
| 1 | 0 | Medium Gain | 81 |
| 0 | 1 | Low Gain | 164 |
| 1 | 1 | Shut Down | — |

The controller 190 may be implemented by any type of programmable controller or programmable logic device. In one embodiment, the controller 190 is implemented as a programmable microcontroller (e.g., a PIC 18LF252 microchip flash microcontroller available from Microchip Technology, Inc. of Chandler, Ariz. U.S.A.).

The interface 192 may be implemented in accordance with a standard interface standard, such as RS232.

Figure 11:
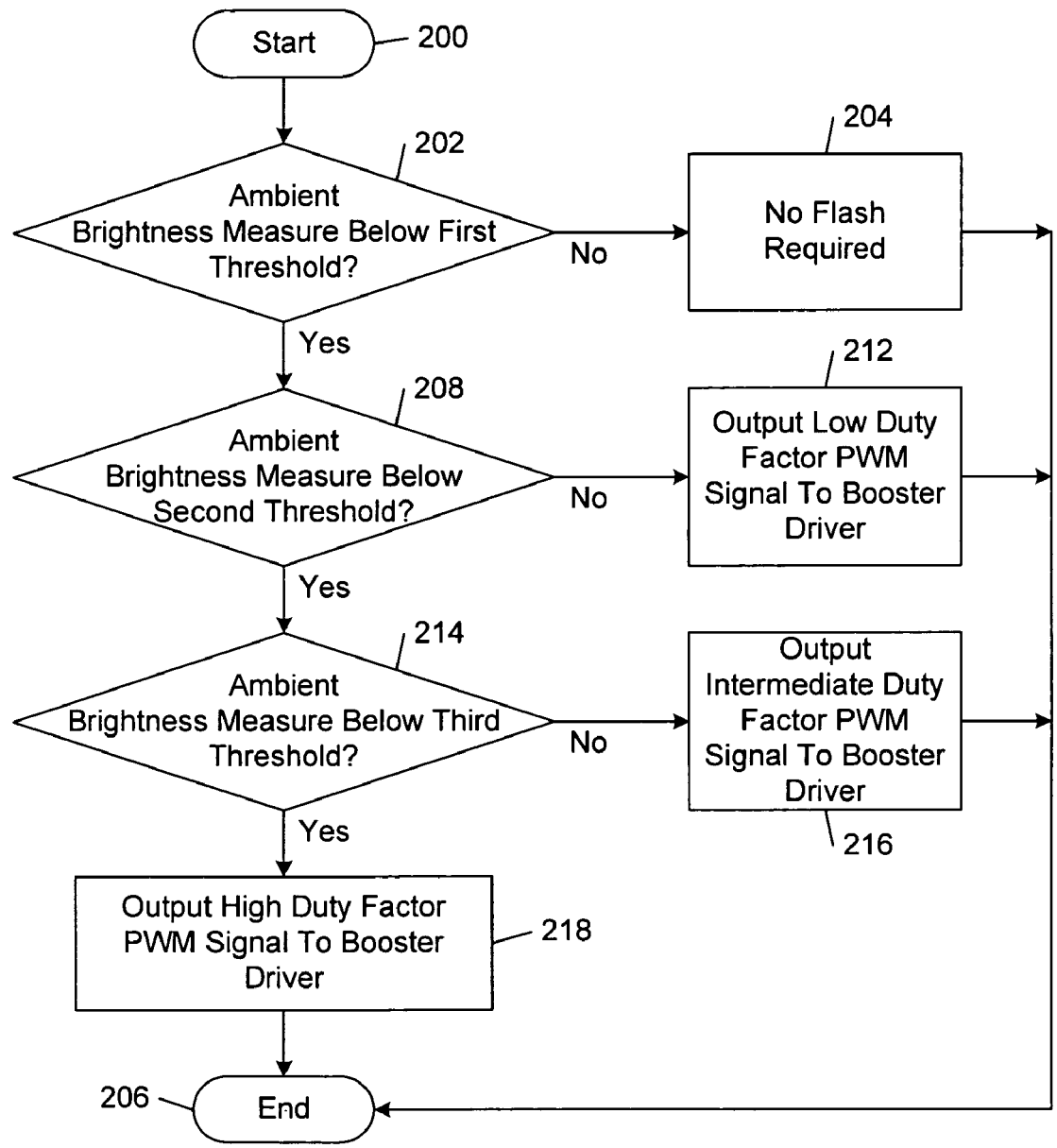
FIG. 11 is a flow diagram of an embodiment of a method executed by an embodiment of the processing system shown in FIG. 1.

FIG. 11 shows an embodiment of an automatic brightness level setting method that is implemented by the imaging and brightness control subsystem 180. In accordance with this embodiment, the controller 190 begins to monitor the output (DOUT) of the ambient light sensor 188 when it receives the flash enable flag (FLAG) from the camera module 182, at which point the controller 190 sets the ambient light sensor 188 to the low gain setting (i.e., A1=0, A0=1), which corresponds to the first (highest) brightness threshold (i.e., 164 lux) (FIG. 11, block 200).

If the ambient brightness measure (DOUT) is at or above the first brightness threshold (FIG. 11, block 202), then no flash is required (FIG. 11, block 204) and the process ends (FIG. 11, block 206).

If the ambient brightness measure is below the first brightness threshold (FIG. 11, block 202), the controller 190 sets the ambient light sensor 188 to the medium gain setting (i.e., A1=1, A0=0), which corresponds to the second (intermediate) brightness threshold (i.e., 81 lux).

If the ambient brightness measure is at or above the second brightness threshold (FIG. 11, block 208), the controller 190 outputs a low duty factor pulse width modulation (PWM) signal 210 to the booster driver 186 (FIG. 11, block 212). The duty factor (or duty cycle) corresponds to the product of the pulse duration and the pulse repetition frequency of the signal 210, equal to the time per second that pulse power is applied. In one exemplary embodiment, the low duty factor is 60%.

If the ambient brightness measure is below the second brightness threshold (FIG. 11, block 208), the controller 190 sets the ambient light sensor 188 to the high gain setting (i.e., A1=0, A0=0), which corresponds to the third (lowest) brightness threshold (i.e., 30 lux).

If the ambient brightness measure is at or above the third brightness threshold (FIG. 11, block 214), the controller 190 outputs an intermediate duty factor PWM signal 210 to the booster driver 186 (FIG. 11, block 216). In one exemplary embodiment, the low duty factor is 80%.

If the ambient brightness measure is below the third brightness threshold (FIG. 11, block 212), the controller 190 outputs a high duty factor PWM signal 210 to the booster driver 186 (FIG. 11, block 218). In one exemplary embodiment, the low duty factor is 100%.

IV. Exemplary Operating Environments for the Imaging System

The imaging system 10 is highly suitable for incorporation in any type of camera-equipped application environments, including those that have significant size, processing, and memory constraints. In some embodiments, the optical sensor system 12, the light source 14, and at least a portion of the processing system 16 are implemented in a discrete device (e.g., a camera-based computer peripheral device, such as a pc camera), and the display 18 is implemented as a separate discrete device, such as a remote display-based system. In these embodiments, the remote system may be any type of display-based appliance that receives image data and ambient light measurement data. Exemplary types of display-based appliances include a general-purpose computer system, a special-purpose computer system, and a video game system. The image data and ambient light measurement data may be transmitted to the remote system over a wired communication link (e.g., a serial communication link, such as an RS-232 serial port, a universal serial bus, or a PS/2 port) or a wireless communication link (e.g., an infrared (IR) wireless link or a radio frequency (RF) wireless link). In other embodiments, the optical sensor system 12, the light source 14, the processing system 16, and the display 18 are integrated into a single unitary device, such as a portable (e.g., handheld) electronic device. The portable electronic device may be any type of device that can be readily carried by a person, including a cellular telephone, a cordless telephone, a pager, a personal digital assistant (PDA), a digital audio player, a digital camera, and a digital video game console.

Figure 12A:
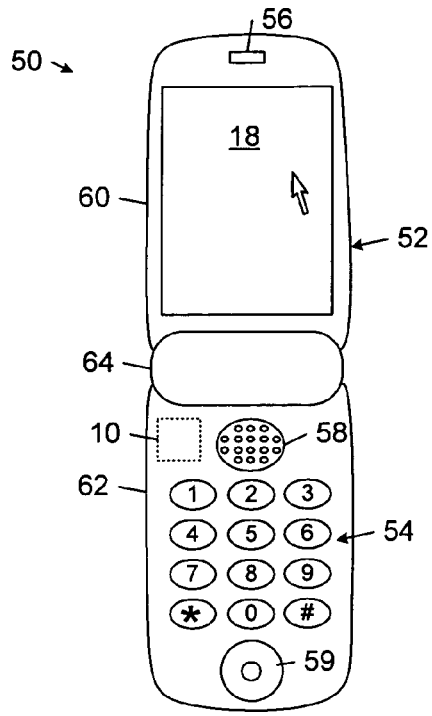
FIG. 12A is a diagrammatic top view of an embodiment of a mobile telephone, which incorporates the imaging system shown in FIG. 1, in an open state.
Figure 12B:
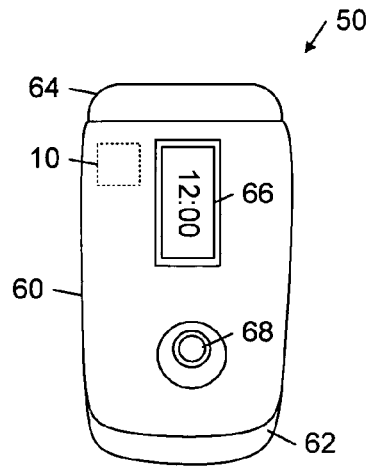
FIG. 12B is a diagrammatic top view of the embodiment of the mobile telephone shown in FIG. 12A in a closed state.

FIGS. 12A and 12B show an embodiment of a mobile telephone 50 that incorporates an embodiment of the imaging system 10. The mobile telephone 50 includes a housing 52, the display 18, a keypad 54, a microphone 56, a speaker 58, and a graphical user interface input device 59. The display 18, the keypad 54, the microphone 56, and the speaker 58 are implemented by standard mobile telephone components. In general, the input device 59 may be implemented by any type of input device that is suitable for controlling a virtual pointer 61 on the display 18. In some embodiments, the input device 59 is implemented by one of a displacement type of input device and a joystick type of input device. In one exemplary embodiment, the input device 59 is implemented by a capacitive input device of the type described in U.S. patent application Ser. No. 11/488,559, which was filed on Jul. 18, 2006, by Jonah Harley et al., and is incorporated herein by reference.

The display 18 and the microphone 56 are exposed through an inner face of a top part 60 of the housing 52. The keypad 54 and the speaker 58 are exposed through an inner face of a bottom part 62 of the housing 52. The top and bottom parts 60, 62 of the housing 52 are connected together by a hinged portion 64, which allows the top and bottom parts 60, 62 to pivot between an open state and a closed state. In the open state shown in FIG. 12A, a user has access to the displays 18, the keypad 54, the microphone 56, the speaker 58, and the input device 59.

FIG. 12B shows a top view of the mobile telephone 50 in the closed state. As shown in this view, the top part 60 of the housing 52 includes a display 66 and at least one optical port 68. The at leas one optical port 68 allows light to be transmitted from the light source 14 to an area outside of the mobile telephone 50 and allows light from an area outside the mobile telephone 50 to be transmitted to the optical sensor system 12.

Figure 13:
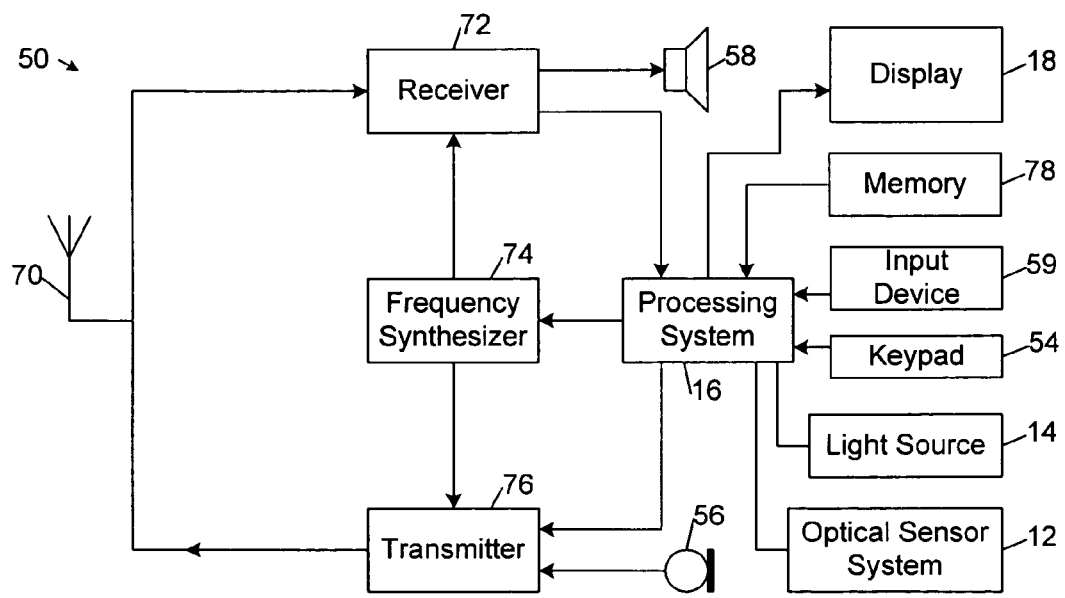
FIG. 13 is a block diagram of an embodiment of the mobile telephone shown in FIGS. 12A and 12B.

FIG. 13 shows a block diagram of components of the mobile telephone 50, including an antenna 70, a receiver 72, the speaker 58, the processing system 16, a frequency synthesizer 74, a transmitter 76, the microphone 56, the keypad 54, a memory 78, and the input device 59. The processing system 16 choreographs the operation of the receiver 72, the transmitter 76, and the frequency synthesizer 74. The frequency synthesizer 74 controls the operating frequencies of the receiver 72 and the transmitter 76, and generates electronic radio frequency signals in response to control signals received from the processing system 16.

Figure 14:
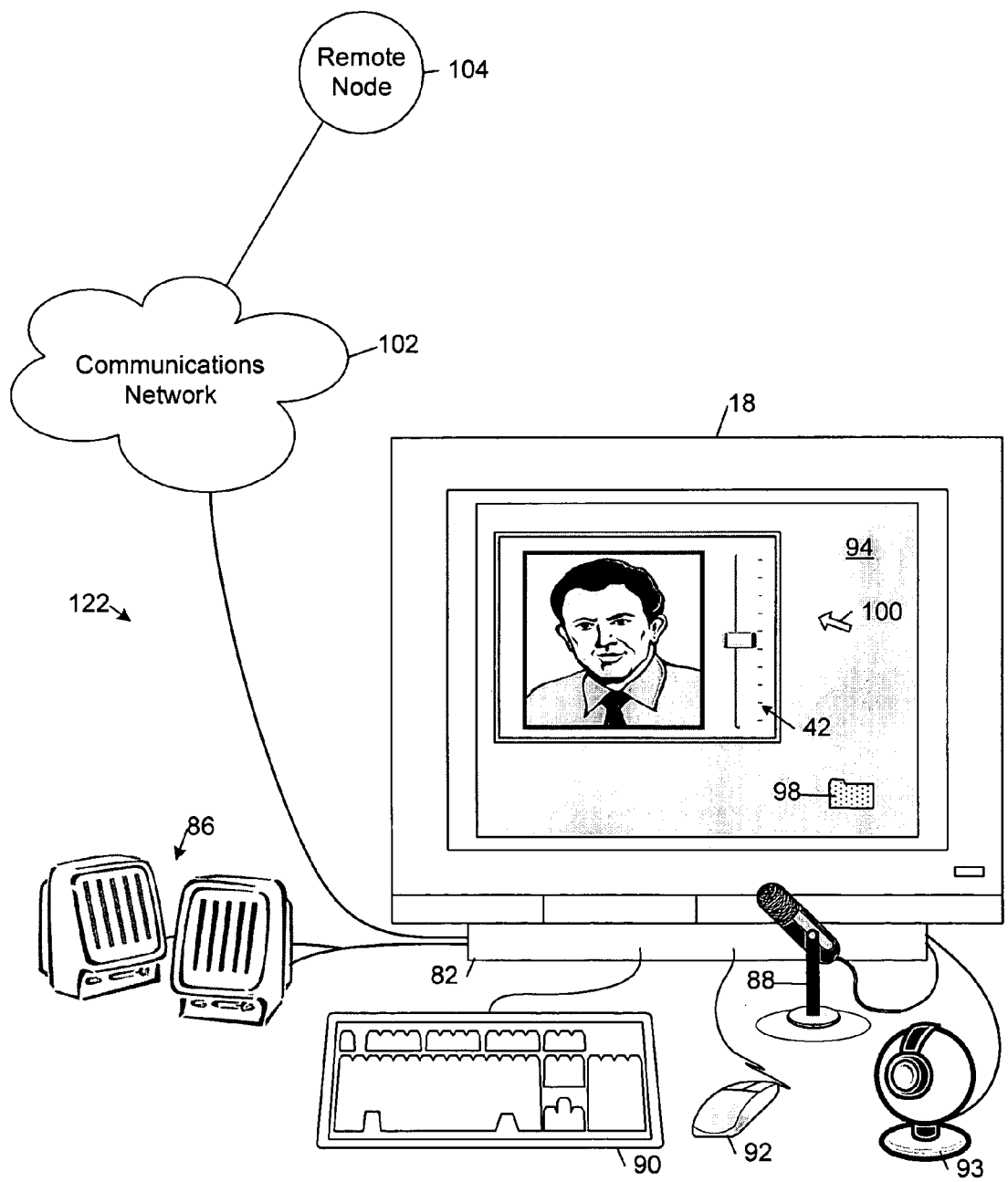
FIG. 14 is a diagrammatic view of an embodiment a computer system that incorporates an embodiment of the imaging system shown in FIG. 1.

FIG. 14 shows an embodiment of a computer system 80 that includes a processing unit 82, which includes at least a portion of the processing system 16, the display 18, a pair of speakers 86, an audio recording device 88, a keyboard 90, a computer mouse 92, and a camera system 93 that incorporates the optical sensor system 12 and the light source 14.

In general, the camera system 93 may implemented in the form of any type of computer peripheral imaging device, including a computer-controllable digital camera and a video camera. In the illustrated embodiment, the camera system 93 is implemented in the form of a pc video camera (or webcam), which is configured to capture images 30 fps (frames per second) at 320×240 resolution, or greater. The camera system 93 typically remains fixed in place and is oriented toward the user of the computer system 80. Some embodiments may include more than one instance of the camera system 93.

The audio recording device 88 may be any type of device that is capable of recording sounds that are produced in the vicinity of the display 84, including wired and wireless microphones. The audio recording device 88 may be fixed in position or it may be attached to the user of the computer system 80. Some embodiments may include more than one instance of the audio recording device 88.

The processing unit 82 may by any type of computer processing system, including a desktop computer processing system, a workstation computer processing system, and a portable computer (e.g., a laptop computer or notebook computer) processing system. The processing unit 82 produces a graphical user interface 94 on the display 84. The graphical user interface 94 is a windows-based graphical user interface that includes one or more windows 96, icons 98, and a pointer 100. The images that are captured by the camera system 93 may be presented in the window 96 and transmitted over a communications network 102 (e.g., the internet) to one or more remote nodes 104. In some exemplary implementations, the processing unit 82 is programmed to implement one or more video conferencing functions that enable a user of the computer system 80 to interact with the one or more remote nodes 104 via two-way video and audio transmissions simultaneously.

V. Conclusion

The systems and methods that are described in detail herein provide graphical user interface based control of imaging parameters, including scene illumination parameters, in a way that enhances the functionality and usability of camera-equipped multifunction devices, while improving the quality of images captured by such devices.

Other embodiments are within the scope of the claims.

What is claimed is:

1. A system, comprising:
 a display;
 an optical sensor system operable to generate optical data in response to light received from a field of view;
 a light source operable to produce output light with a variable brightness level and to project the output light toward the field of view; and
 a processing system operable to:
  process at least a portion of the optical data into image data presentable on the display,
  generate on the display a brightness control interface operable to receive user input specifying one brightness amount from among a plurality of at least three different brightness amounts, and
  produce an illumination control signal in response to user input specifying the one brightness amount to the brightness control interface, the illumination control signal configuring the light source to produce the output light with a brightness level corresponding to the brightness amount specified to the brightness control interface.

2. The system of claim 1, wherein the optical sensor system comprises an image sensor and an ambient light sensor, the image sensor being operable to generate image optical data corresponding to images of the field of view, the processing system being operable to process the image optical data into the image data, and the ambient light sensor being operable to produce a measure of brightness of light received from the field of view.

3. The system of claim 1, wherein the optical sensor system comprises an image sensor operable to generate image optical data corresponding to images of the field of view, and the processing system is operable to process the image optical data into the image data and to produce from the image optical data a measure of brightness of light received by at least a portion of an active region of the image sensor.

4. The system of claim 1, wherein the processing system is operable to produce from the optical data a measure of brightness of light received from the scene.

5. The system of claim 4, wherein the processing system is operable to generate the brightness control interface on the display in response to a determination that the brightness measure fails to meet a brightness level threshold.

6. The system of claim 1, wherein the optical sensor system comprises an image sensor and a configurable diaphragm defining an aperture with a variable size controlling light received by the image sensor, and the processing system is operable to produce a diaphragm control signal configuring a size of the aperture.

7. The system of claim 6, wherein the processing system is operable to generate on the display an aperture control interface operable to receive user input specifying the aperture size.

8. The system of claim 7, wherein the processing system is operable to produce from the optical data a measure of brightness of light received from the scene.

9. The system of claim 8, wherein the processing system is operable to generate the brightness control interface and the aperture control interface on the display in response to a determination that the brightness measure fails to meet a brightness level threshold.

10. The system of claim 9, wherein:
in response to user input specifying the brightness amount to the brightness control interface, the processing system is operable to automatically produce the illumination control signal based on the specified brightness amount; and
in response to user input specifying an aperture size to the aperture control interface, the processing system is operable to automatically produce diaphragm control signal based on the specified aperture size.

11. The system of claim 1, further comprising a microphone operable to produce audio data in response to sounds received from the field of view, and a network interface operable to transmit the image data and the audio data to a network node over a communications network and to receive image data and audio data from the network node over the communications network.

12. The system of claim 1, wherein the display, the optical sensor system, the light source, and the processing system are integrally incorporated in a unitary device structure.

13. The system of claim 1, wherein the processing system comprises a host device processing subsystem and a peripheral device processing subsystem, and further comprising a discrete peripheral device housing and a discrete host device housing separate from the peripheral device housing, the host device housing being physically attached to the display and the host device processing subsystem, and the peripheral device housing being physically attached to the optical sensor system, the light source, and the peripheral device processing subsystem.

14. A system, comprising:
a display;
an optical sensor system operable to generate optical data in response to light received from a field of view;
a light source operable to produce output light with a variable brightness level and to project the output light toward the field of view; and
a processing system operable to:
process at least a portion of the optical data into image data presentable on the display,
generate on the display a brightness control interface operable to receive user input specifying a brightness level, and
produce an illumination control signal in response to user input specifying the brightness level to the brightness control interface, the illumination control signal configuring the light source to produce the output light with a brightness level corresponding to the brightness level specified to the brightness control interface, wherein:
the optical sensor system comprises an image sensor and an ambient light sensor, the image sensor being operable to generate image optical data corresponding to images of the field of view, the processing system being operable to process the image optical data into the image data, and the ambient light sensor being operable to produce a measure of brightness of light received from the field of view, and
the processing system is operable to drive the light source with a pulse width modulation (PWM) drive signal having a duty cycle selected based on a comparison of the brightness measure with one or more brightness thresholds.

15. A method, comprising:
generating optical data in response to light received from a field of view;
producing output light;
projecting the output light toward the field of view;
processing at least a portion of the optical data into image data presentable on a display;
generating on the display a brightness control interface operable to receive user input specifying one brightness amount from among a plurality of at least three different brightness amounts; and
producing an illumination control signal in response to user input specifying the one brightness amount to the brightness control interface, the illumination control signal configuring the output light to be produced with the brightness level corresponding to the brightness amount specified to the brightness control interface.

16. The method of claim 15, further comprising producing from the optical data a measure of brightness of light received from a scene.

17. The method of claim 15, further comprising producing a diaphragm control signal configuring a size of an aperture controlling the light received from the field of view.

18. The method of claim 17, further comprising generating on the display an aperture control interface operable to receive user input specifying the aperture size.

19. The method of claim 18, further comprising:
producing from the optical data a measure of brightness of light received from the scene; and
generating the brightness control interface and the aperture control interface on the display in response to a determination that the brightness measure fails to meet a brightness level threshold.

20. The method of claim 19, wherein:
in response to user input specifying the one brightness amount to the brightness control interface, automatically producing the illumination control signal based on the specified brightness amount; and
in response to user input specifying an aperture size to the aperture control interface, automatically producing a diaphragm control signal based on the specified aperture size.

21. The method of claim 15, further comprising:
producing audio data in response to sounds received from the field of view,
transmitting the image data and the audio data to a network node over a communications network, and
receiving image data and audio data from the network node over the communications network.

* * * * *